United States Patent

[11] 3,585,853

| [72] | Inventor | Christie S. Magdalin |
| --- | --- | --- |
| | | Des Plaines, Ill. |
| [21] | Appl. No. | 628,307 |
| [22] | Filed | Apr. 4, 1967 |
| [45] | Patented | June 22, 1971 |
| [73] | Assignee | Magnaflux Corporation |
| | | Chicago, Ill. |

[54] METHOD OF REMOVING PENETRANT USED IN FLOW TESTING
3 Claims, No Drawings

| [52] | U.S. Cl. | 73/104 |
| --- | --- | --- |
| [51] | Int. Cl. | G01n 21/16 |
| [50] | Field of Search | 73/104 |

[56] References Cited

UNITED STATES PATENTS

| 2,707,236 | 4/1955 | DeForest | 73/104 X |
| --- | --- | --- | --- |
| 3,349,041 | 10/1967 | Alburger | 252/301.2 |
| 3,401,556 | 9/1968 | Borucki | 73/104 |
| 3,422,670 | 1/1969 | Alburger | 73/104 |

*Primary Examiner*— Richard C. Queisser
*Assistant Examiner*— John P. Beauchamp
*Attorney*— Hill, Sherman, Meroni, Gross & Simpson

ABSTRACT: An aerosol foam composition for removing excess of a dyed liquid penetrant, or penetrant residue, from a workpiece. The composition foams upon application to the surface and effects a superficial emulsification of any excess of penetrant, together with dye therein, without penetrating any surface discontinuity, so as to facilitate the wiping off of such excess without removing any penetrant entrapped in surface discontinuities. The composition is an aqueous solution, or homogeneous dispersion, of a surfactant, a frothing or foaming agent and a coupling agent, together with a liquefied gas propellant which is miscible with the aqueous solution of the named components, and which, upon vaporization during release of the composition from its container, effects the release of said composition as an aerosol.

METHOD OF REMOVING PENETRANT USED IN FLOW TESTING

BACKGROUND OF THE INVENTION

This invention is in the field of nondestructive testing for detecting surface discontinuities in rigid articles by the penetrant method of inspection under "white" light, if the penetrant contains a visible dye, and under filtered ultraviolet light, or "black" light, if the penetrant contains a fluorescent dye.

The prior art discloses the use of liquid emulsifying compositions of a nonfoaming character for emulsifying excess penetrant or for rendering the dye penetrant emulsifiable or water miscible and therefore removable by water washing. U.S. Pat. Nos. 2,405,078, 2,806,959, 2,978,418 and 3,282,843 represent prior art in this field.

The present invention solves the problem of limiting the emulsifying action to the excess of penetrant on the surface without extending such action to any penetrant within any surface discontinuities. It also facilitates the removal of the excess penetrant by a simple wiping action with an absorbent material, or by water washing.

SUMMARY OF THE INVENTION

The aerosol foam-forming composition of my invention is adapted to be applied as an aerosol from a conventional aerosol can and foams upon striking the surface where emulsification of the excess penetrant is to be effected, yet does not penetrate any surface discontinuity. In its preferred form, the composition is an aqueous solution, or stable, homogeneous dispersion, of a surfactant, a foaming agent, a coupling agent and, optionally, a corrosion inhibitor, together with a liquefied gas propellant miscible with the aqueous solution so as not to form separate layers upon standing in the container. The corrosion inhibitor may be omitted if the container is noncorrodible or has a lining sufficiently resistant to corrosion to make an inhibitor unnecessary.

Various surfactants can be used such as polyalkoxylated alkyl phenols, preferably a nonyl phenyl polyethylene gylcol ether or a mixture thereof having an average of between one and 15 ethylene oxide groups per molecule and having a satisfactory hydrophilic-lipophilic-balance for forming a stable emulsion, or dispersion, with the other ingredients of the composition.

As a foaming agent, any water-soluble or dispersible surfactant, that lowers the surface tension of the liquid composition sufficiently to cause the composition to foam after release as an aerosol, can be used.

Coupling agents that have been found satisfactory are the following:

Polyoxyalkylene glycols and monoether derivatives thereof, available as the proprietary products of Carbide & Carbon Chemicals Division of Union Carbide and Carbon Corporation, N.Y., under the trademark "Ucon," "HB" and "H" series.

The coupling agents function to effect miscibility between the aqueous and the liquefied gas portions of the composition.

Since an aqueous aerosol composition is used, a corrosion inhibitor is employed if corrosion of the container is a factor. A preferred inhibitor is sodium nitrite.

Various propellants normally used in the preparation of aerosol compositions can be used, such as the fluorocarbons, F-11, F-12, F-13, F-113 and others, with or without a moisture inhibitor (designated by the subscript "SBA" by the supplier, e.g., F-12SBA). Mixtures of liquefied normally gaseous propellants by themselves, or together with inert gases under pressure, can be employed.

DESCRIPTION OF THE PREFERRED EMBODIMENTS

The following is an example of the broader, operative ranges of the aqueous portion of my composition:

| | Parts by weight |
|---|---|
| Water | 100-180 |
| Surfactant | 25-50 |
| Foaming agent | 10-65 |
| Coupling agent | 15-45 |
| Corrosion inhibitor | 0-2 |

In the above formula, various surfactants can be used, such as polyalkoxylated glycol phenols, sometimes referred to as alkyl phenyl polyalkylene glycol ethers; e.g., a nonyl phenyl polyethylene glycol ether, having between seven and 15 ethylene oxide groups per molecule, has been found most satisfactory. In general, however, any cold water soluble surfactant, whether nonionic, cationic or anionic, can be used. The proprietary products of the Triton series, available from the proprietor, Rohm & Haas Co., as Triton X-100, X-114 and X-120, etc., can be used. These surfactants are nonionic and in the composition of my invention effect sufficient reduction in the surface tension of the liquid to facilitate the formation of a foam. The selected surfactant should be water miscible and exhibit some emulsifying properties toward mixtures of aqueous and nonaqueous components of my composition.

As a specific foaming agent, I have found a proprietary product of Los Angeles Chemical Co., South Gate, Cal., which is designated as "Soluble Pine Oil-Solvents" to be most satisfactory. However, any of the usual foaming agents employed with aerosol compositions, such as organosilicone polymers, can also be employed. The foaming agents aid in the making of a smooth and persistent foam after the composition has been applied as an aerosol to the surface containing any excess of the dyed penetrant.

As coupling agents, the proprietary products of Carbide and Carbon Chemicals Company known as "Ucons" of the 50-HB and 75-H series, which are water soluble, have been found satisfactory. These are said to be polyalkylene glycols and derivatives, the particular "Ucons" preferably used in my composition being the following and having the indicated chemical structure and physical properties:

"Ucon 50-HB 55," which is a water-miscible polymerized, monohydroxy, oxyethyleneoxy 1, 2-propylene aliphatic monoether, having a viscosity of 55 SUS at 100° F.

"Ucon 75 H-1400," which is a water-miscible polymerized, oxyethyleneoxy 1, 2-propylene diol, having a viscosity of 1,400 SUS at 100° F.

In place of the "Ucon," various other alkylene glycols and derivatives thereof can be used, such as butyl "Cellosolve," an ethylene glycol monobutyl ether. A coupling agent, such as any of these, renders the aqueous component of my composition miscible with the nonaqueous component, represented by the liquefied normally gaseous propellant and blowing agent, so that a stable nonstratifying liquid can be obtained and maintained in the aerosol container.

As the corrosion inhibitor, sodium nitrite is preferred, but any of the well-known corrosion inhibitors, such as mixtures of water-soluble chromate and zinc compounds, as in U.S. Pat. No. 2,900,222; and mixtures of potassium dichromate, sodium orthovanadate, sodium nitrite and boric acid, as in U.S. Pat. No. 3,028,338, can also be used.

An amount of propellant and blowing agent should be used that is sufficient to impose a pressure of from 50 to 110 p.s.i.g. upon the liquid composition when confined in an aerosol can. Any of the previously mentioned fluorocarbons, or mixtures thereof, capable of imposing a pressure on the can between the limits stated, and preferably a pressure of about 85 p.s.i.g., can be used as the propellant and/or blowing agent.

The following is a preferred embodiment of the composition of my invention:

| | Parts by weight |
|---|---|
| Water | 125 |
| Tergitol NPX | 44 |
| Soluble Pine Oil, Solvent | 38 |
| Ucon 50-HB 55 | 29 |
| Sodium Nitrite, $NaNO_2$ | 1.7 |

This preferred composition has a specific gravity of 1.00 at 25° C.; a viscosity of 23.7 cps; and is preferably under a pressure of 85 p.s.i.g. within a 12 oz. conventional aerosol can. A typical ratio of liquefied propellant, such as F-12, to the aqueous solution component, W/V, is 33.8 grams of F-12 to 285 ml. of solution.

In practicing the method of my invention, using a composition such as herein described, the workpiece, or article to be tested, has had applied to it a colored liquid penetrant, which may be of the oily, or "bleeding," type, containing a visible or fluorescent dye, or a penetrant comprising a relatively highly volatile solvent as the liquid vehicle; or a penetrant of the water-based type.

After the application of the dyed liquid penetrant, the workpiece is allowed to stand for a sufficient length of time for the penetrant to penetrate onto any surface discontinuities. In the case of the volatile solvent type of penetrant, both the penetration of the penetrant into surface discontinuities and the drying of any excess penetrant on the surface are quite rapid, but in the case of the bleeding type penetrant, drying is slower and does not go to completion.

After the applied liquid penetrant has been allowed to stand for the proper length of time, depending upon the nature of the liquid vehicle penetrant, the composition of my invention is applied as an aerosol to the surface of the workpiece, where it forms a relatively thick and persistent foam on top of the excess of the dyed penetrant, or penetrant residue, remaining on such surface. Due to the light weight of the foam, there is little more than superficial contact between the foam and the underlying excess of dyed penetrant, or residue thereof.

Furthermore, the foam is of such stiff consistency as not to drain off of the surface, so presents no draining problem that requires a draining area. Some diffusion of the foam into the underlying penetrant residue takes place, but no significant amount of emulsification.

The foam is next removed, either by wiping with a dry or water-moistened absorbent material, such as a rag, or by water washing. During such removal an intimate mixing of the foam and the dyed penetrant, or penetrant residue, takes place, with the result that the dye and liquid vehicle of the penetrant are caused to be emulsified with the foam and are removed in the form of an emulsion, or, if water washing is used, the dye and liquid vehicle of the penetrant are rendered sufficiently water miscible to be removed with the wash water. In any case, a clean surface free of any excess of penetrant is produced, but without removing any of the penetrant, or penetrant residue, that may have become entrapped in surface discontinuities.

To the thus cleaned surface is then applied a developer, which may be a dry or wet developer, which brings out visible indications of any surface flaws and makes them easy to detect by inspection under "white" light, in the case of visible dyes, and under "black" light, in the case of fluorescent dyes.

Various advantages, some of which have already been indicated, flow from the use of my composition in a liquid penetrant method of inspection for surface discontinuities. The penetrant itself need not contain a dye where the developer contains one or reacts with the penetrant to form, or itself forms a visible or otherwise detectable indication. One of the advantages is that my composition can be packaged in conventional aerosol cans so as to be easily handled wherever the foam-forming composition is to be used. As further advantages, the foam produced does not penetrate surface discontinuities, even in the case of relatively shallow flaws or defects, and therefore is conducive of obtaining reliable indications of any surface discontinuities in the workpiece undergoing test. The foam produced by my aerosol composition can be used without the application of water in the removal of excess penetrant, where the use of water would be disadvantageous.

The following are further specific formulations of aqueous compositions for use with liquefied gas propellants and/or blowing agents, such as previously mentioned:

Formulation I.:
 50 ml., "Soluble Pine Oil"
 50 ml., "Tergitol NPX"
 150 ml., Water
 100 ml., Ethylene Glycol
 10-20 gm., Corrosion Inhibitor.

Formulation II.:
 50 ml., Propylene Glycol
 50 ml., "Tergitol NPX"
 150 ml., Water
 10-20 gm., Corrosion Inhibitor.

Formulation III.:
 50 ml., "Hyamine 3500" (N-alkyl dimethyl benzyl ammonium chlorides in 80% anhydrous ethanol)
 50 ml., Propylene Glycol
 150 ml., Water
 10-20 gm., Corrosion Inhibitor.

Formulation IV.:
 12-15 gm., "Deriphat" 154 (Di Sodium N-Tallow B-aminodipropionate)
 50 ml., Propylene glycol
 150 ml., Water
 10-20 gm., Corrosion Inhibitor.

Formulation V.:
 50 ml., "Tergitol NPX"
 50 ml., Butyl Cellosolve
 150 ml., Water
 10-20 gm., Corrosion Inhibitor.

Formulation VI.:
 150 ml., ZE-3
 250 ml., Water
 10-20 gm., Corrosion Inhibitor.

In the foregoing formulations the following proprietary ingredients have the indicated chemical compositions:

"Soluble Pine Oil"—contains 60 percent pure steam-distilled pine oil, with balance a potash-resin soap as an emulsifier and detergent, plus less than 10 percent water by weight.

"Tergitol NPX"—a nonyl phenyl polyethylene ether, liquid, 100 percent, and water soluble, Rohm & Haas Co.

"Hyamine 3500"—a N-alkyl ($C_{12}$, $C_{14}$, $C_{16}$) dimethyl benzyl ammonium chloride, liquid, 50 or 80 percent, a cationic surfactant, Rohm & Haas.

"Deriphat 154"—a disodium salt of N-tallow beta amino diproprionate, amphoteric, solid, 100 percent, of high solubility in presence of alkalies and inorganic builders, General Mills, Inc.

"ZE-3"—a mixture of petroleum distillates and sulfonates, Magnaflux Corporation.

No specific foaming agent is necessary since, as in Formulations II through VI, even without a specific foaming agent, the combination of surfactant, coupling agent and water results in a foam when applied to the surface of the workpiece.

It will be understood that modifications and variations may be effected without departing from the scope of the novel concepts of the present invention.

I claim:

1. In the method of nondestructive testing in which a non-water miscible liquid penetrant is applied to the surface of a workpiece to detect discontinuities therein and the excess of penetrant not entrapped in any discontinuities is removed before inspection for discontinuities, the improvement which comprises applying to the surface having the excess of penetrant thereon a foam-forming composition in the form of an aerosol, said composition comprising an aqueous component of a coupling agent and a surfactant effective in combination to emulsify said penetrant; and a nonaqueous component of a liquefied normally gaseous propellant miscible with said aqueous component; and removing said foam and emulsified penetrant before inspection.

2. The method as defined by claim 1, wherein the surfactant is a water miscible alkyl phenyl polalkylene glycol ether.

3. The method as defined by claim 1, wherein said aqueous component consists essentially of the following ingredients within the ranges specified in parts by weight:

| | |
|---|---|
| Water | 100–180 |
| A nonyl phenyl polyethylene glycol ether | 25–50 |
| A soluble pine oil | 15–65 |
| A water-miscible, polymerized monohydroxy, oxyethyleneoxy 1,2-propylene aliphatic mono-ether, and a liquefied normally gaseous propellent-blowing agent | 15–45, q.s. |

The composition being under a pressure of from 50 to 110 p.s.i.g.